April 3, 1956     S. N. HEAPS     2,740,488
SEISMIC SHEAR WAVE GENERATOR

Filed May 8, 1952     4 Sheets-Sheet 1

STANLEY N. HEAPS
*INVENTOR.*

BY D. Carl Richards
*AGENT*

April 3, 1956 S. N. HEAPS 2,740,488
SEISMIC SHEAR WAVE GENERATOR
Filed May 8, 1952 4 Sheets-Sheet 2

STANLEY N. HEAPS
INVENTOR.

BY
AGENT

April 3, 1956   S. N. HEAPS   2,740,488
SEISMIC SHEAR WAVE GENERATOR
Filed May 8, 1952   4 Sheets-Sheet 3

STANLEY N. HEAPS
INVENTOR.

BY D. Carl Richards
AGENT

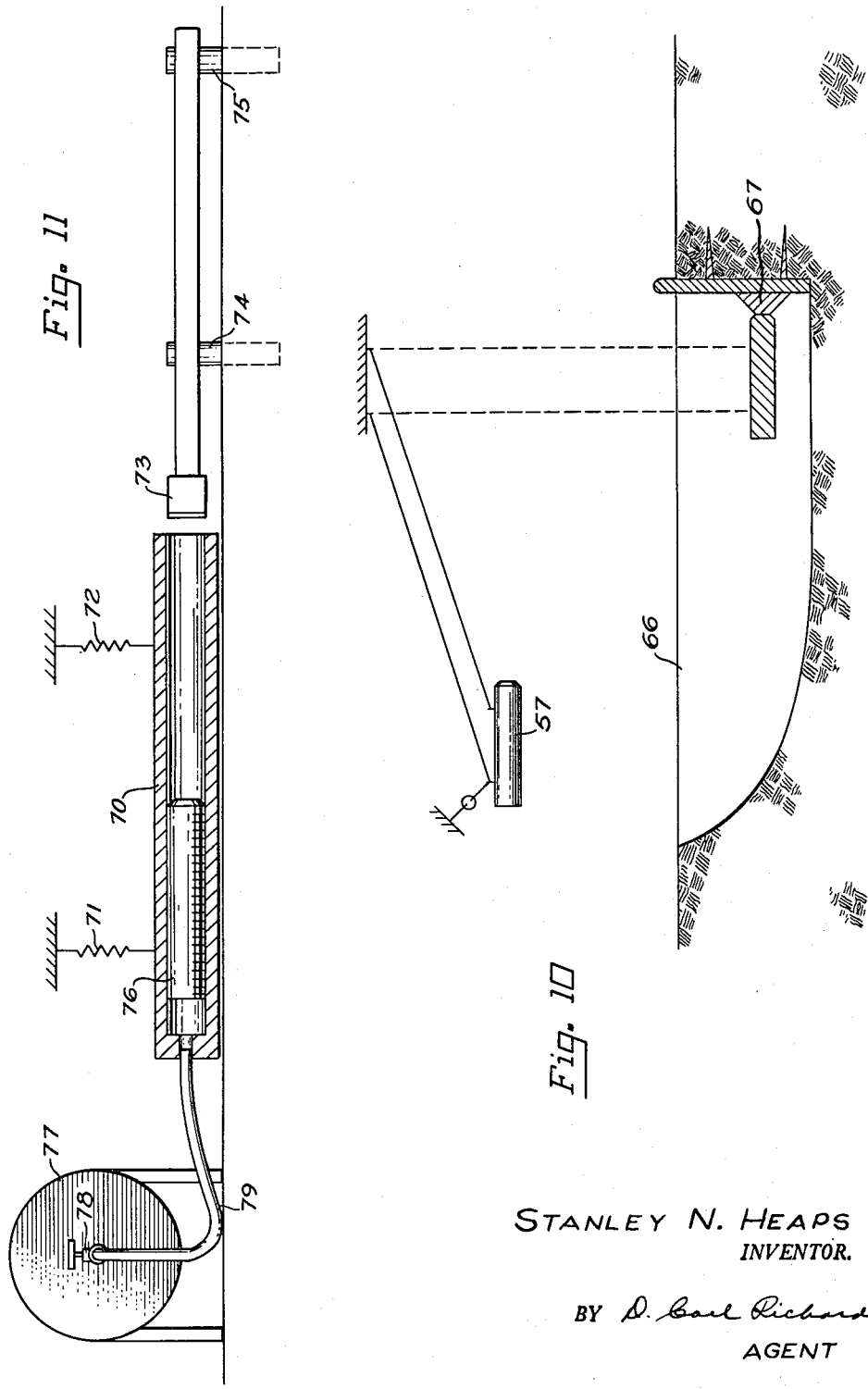

United States Patent Office 2,740,488
Patented Apr. 3, 1956

2,740,488

SEISMIC SHEAR WAVE GENERATOR

Stanley N. Heaps, Dallas, Tex., assignor, by mesne assignments, to Socony Mobil Oil Company, Inc., a corporation of New York Application May 8, 1952, Serial No. 286,663

5 Claims. (Cl. 181—.5)

This invention relates to seismic exploration and more particularly to generation of shear waves for the location of subsurface reflecting interfaces.

Seismic exploration has been extensively used for delineation of subsurface formations. Investigations have been almost exclusively limited to use of vibrational motion of the earth's surface in a compressional mode for determining earth structure. This parameter while extremely useful and remarkably successful in vast areas is subject to limitations that impede the discovery and development of petroleum resources in many areas of complex lithology.

Shear waves, that is waves in which particle motion is in a direction normal to the direction of propagation, offer advantages not possible in the use of compressional waves. The velocity of a sheer wave through a given medium is in the order of one-half the velocity of a compressional wave. For a given frequency shear waves occupy much less space along the travel path than do compressional waves and therefore offer the possibility of greater resolution and the detection of thinner beds with greater accuracy than is possible with compressional waves. The reflection co-efficients affecting a shear wave at an interface between two contrasting acoustic media express themselves differently than with respect to compressional waves.

It is therefore an object of the present invention to provide for the generation of shear waves polarized in a direction normal to the paths customarily employed in reflection and refraction seismograph techniques.

In accordance with the present invention there is provided a system for generation of shear waves which comprises a mass located at a sending station on the earth's surface with means for propelling the mass along a traverse at least in part horizontal. A target is positioned in the path of said mass and is anchored firmly to the earth's crust with maximum stiffness in the direction of said traverse for abruptly decelerating the mass. In a preferred form of the invention means intermediate the mass and the target is provided to control the character of the energy imparted to the earth.

For a more complete understanding of the present invention and for further objects and advantages thereof, reference may now be had to the following description taken in conjunction with the accompanying drawings in which:

Fig. 10 is a modification of a shear wave generating system; and

Fig. 11 is a further modification of shear wave generation.

Figure 1:
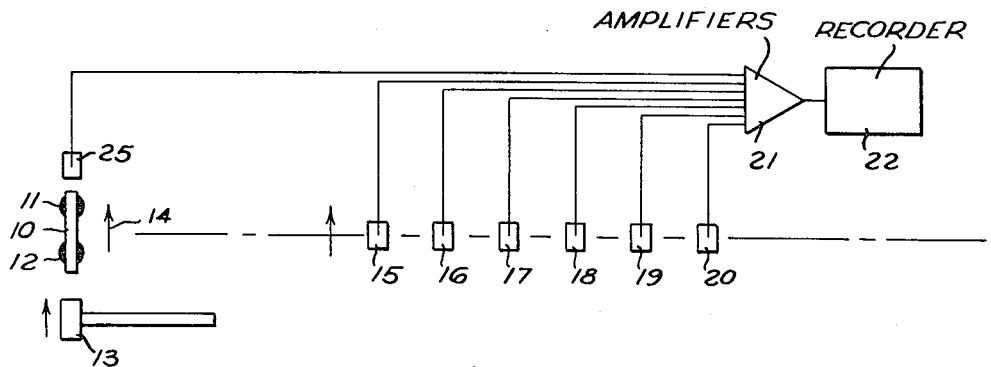
Fig. 1 is a plan view schematically illustrating the use of shear waves in seismic exploration.

Referring now to Fig. 1, where a system for utilizing shear waves for seismic exploration is schematically illustrated, a target 10 of suitable design is fastened to the earth as by suitable anchoring means 11 and 12 buried in the earth's surface. A mass such as a hammer 13 is directed to impinge the target 10 during a portion of its traverse which is horizontal and parallel to the direction vector 14. Upon impact a shear wave is produced characterized by particle motion parallel to the direction of vector 14. The shear wave is propagated in all directions from the point of generation but at any point, particle motion is perpendicular to the direction of propagation. Thus shear waves travel along the earth's surface and also down into the earth in a direction normal to vector 14 with particle motion parallel to vector 14. Such waves travel through surface formations and may be refracted or reflected to impinge detectors spaced at receiving stations located along a line normal to vector 14.

Six detectors 15–20 are positioned along the line normal to vector 14. The detectors are oriented for detection of earth movement along lines parallel to vector 14. The detectors 15–20 are connected through suitable signal channels to amplifying means 21 which in turn is coupled to recorded 22 for recording the signals generated by detectors 15–20 in response to earth movement. An additional detector 25 is coupled to the earth at or adjacent to the sending location for generation of a signal corresponding with the instant of impact of the weight 13 on target 10. Thus there is produced at the recorded 22 a first signal corresponding in time with the generation of shear waves and additional signals spaced in time with reference to the first signal in the same manner as subsurface reflecting interfaces having shear reflection properties correspond in space to the surface of the earth, thus providing means for determining the nature of the earth strata between the source and the detectors. From the standpoint of the travel of seismic waves, the formations at any point along any real travel path between the transmitting station and receiving station may properly be considered as being between them and for the purpose of the present description will be thus referred to.

Figure 2:
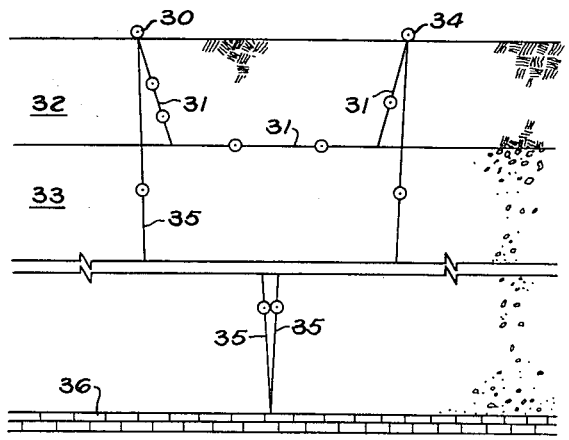
Fig. 2 is a sectional view through the earth illustrating one mode of shear wave propagation.

Referring to Fig. 2, a first mode of the propagation of shear waves has been illustrated in a sectional view of a portion of the earth's surface. The arrow 30 directed into the plane of the paper represents motion upon impact of the mass 13 on the target 10 of Fig. 1. The energy in the resultant shear wave is propagated along a refraction path 31 including the interface between a surface formation 32 and a subsurface formation 33 to a receiving station 34. The direction of particle motion associated with the shear wave remains at all times parallel to the surface of the earth in the refraction path as indicated by arrows directed into the plane of the paper. Similarly the shear wave energy may travel along a reflection path 35 to a relatively deep subsurface interface 36 and thence to the receiving station 34. In this case also the particle motion of the shear wave energy is along lines parallel to the surface of the earth and to the direction of impact of the weight or hammer 13 on the target 10. Fig. 2 then corresponds in section with the plan view of Fig. 1.

Figure 3:
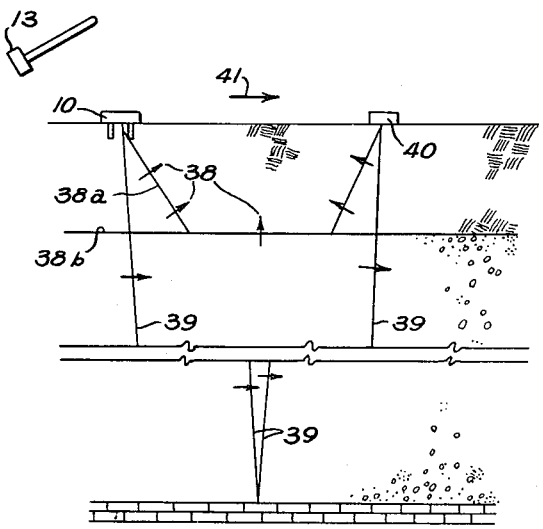
Fig. 3 is a similar section showing a different mode of propagation of shear waves.

In contrast, Fig. 3 illustrates a system in which the mass 13 strikes the target 10 in a direction such that the receiving station is along a line which is included in the plane of the motion of the mass 13. In this case, as indicated by the arrows 38, particle motion for refracted energy is not parallel to the earth's surface. However, the reflection path 39 is substantially normal to the earth's surface so that the particle motion is parallel to the earth's surface, and a detector positioned at the receiving station 40 sensitive to earth motion in a direction parallel to the arrow 41 and parallel to the earth's surface would produce signals representative of and dependent upon shear waves traveling into the earth.

In a system such as shown in Fig. 3, shear wave energy traveling along the path 38a, upon reaching the shallow interface 38b is transformed, at least in part, into compressional energy which may then give rise to relatively complex motion at the earth's surface. Interpretation of the resultant motion in terms of subsurface structure may be most difficult, and it is therefore apparent that the system illustrated in Figs. 1 and 2 is preferable to the system of Fig. 3. In the former, particle motion at the detector is restricted substantially entirely to shear wave energy, and the interference at the receiving station to compressional waves generated upon impact and/or transformation at a shallow interface is minimized.

Figure 4:
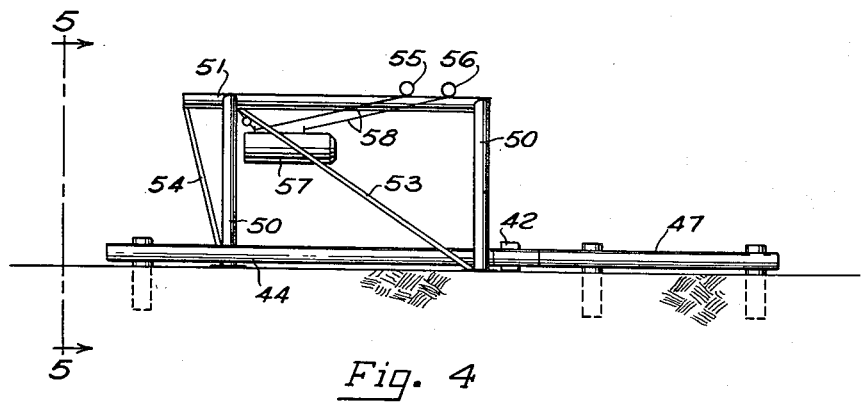
Fig. 4 is an elevation view of a shear wave generator constructed in accordance with the present invention.
Figure 5:
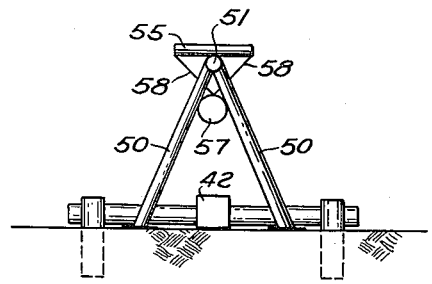
Fig. 5 is an end view of the generator of Fig. 4 looking from line 5—5 of Fig. 4.
Figure 6:
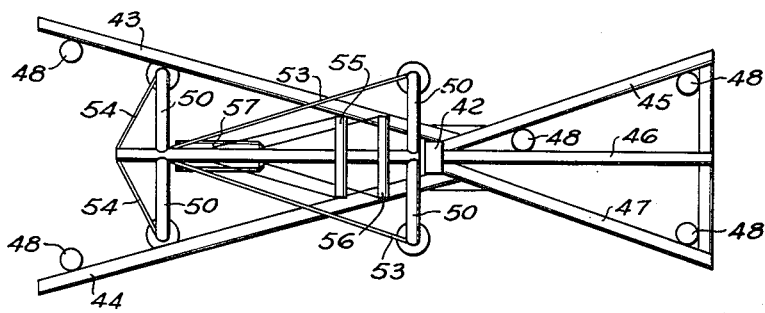
Fig. 6 is a top view of the generator of Fig. 4.
Figure 7:
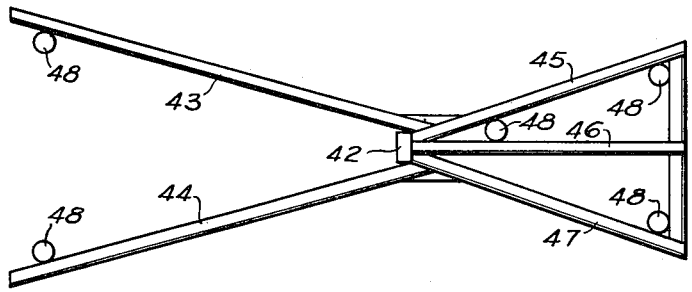
Fig. 7 is a top view of an anchoring system to be used with the generator of Fig. 4.

Figs. 4-9 illustrate a pendulum device for the generation of shear wave energy of polarization, frequency and magnitude suitable for the investigation of the character of the earth's crust. An earth coupling unit or anchor, best seen in Fig. 7, includes a target 42 of relatively low mass, rigidly coupled to and supported by a framework including arms 43, 44, 45, 46 and 47. The framework is an integral unit securely welded at and adjacent to the target 42. The framework, having arms extending in several directions from the target, encompasses a substantial surface area. A plurality of ground anchors, such as pipes extending a few feet into the earth's surface, are connected as by clamping or welding to the framework members. In Fig. 7 five such anchors, 48, are shown at the ends of the arms. Intermediate anchors may be added to secure the framework to the earth if needed. In Fig. 4 the framework is shown positioned preferably level on the surface of the earth at a sending location. A suitable structure is provided to support a mass which upon release may be dropped along an arc to impinge the target 42.

Figure 8:
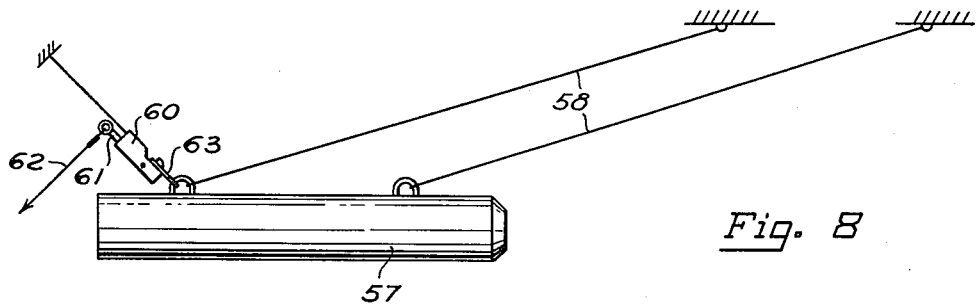
Fig. 8 illustrates suspension of the mass together with releasing means.
Figure 9:
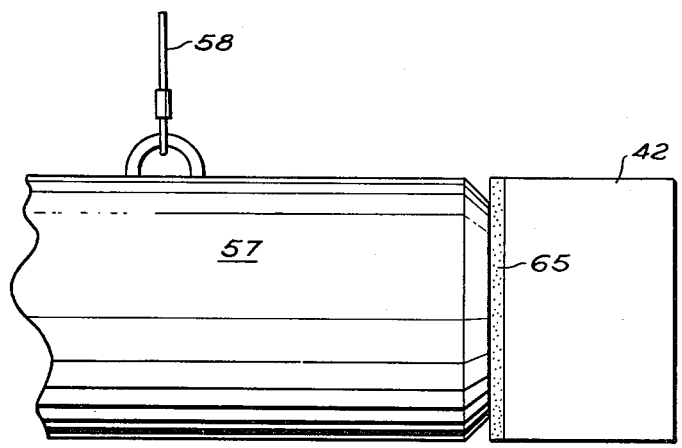
Fig. 9 illustrates the mass in contact with the target.

More particularly, referring to Figs. 4-6, legs 50 support a ridge pole 51 with the lower end of the legs braced from the ridge pole by bars 53 and 54. A pair of cross arms 55 and 56 are carried by and arranged perpendicular to the ridge pole and are rigidly connected thereto adjacent to the right hand end of the support as viewed in Fig. 4. A pendulum system including a mass 57, a metallic cylinder of iron for example, is suspended as by cables 58 from the extremities of the cross arms 55 and 56. As best illustrated in Fig. 8, the cylinder or weight 57 is latched near the top of an arc measured by the length of the cables 58 by a mechanism 60 which includes a hooked portion together with a triggering arm 61 to which there is connected a cable 62 or other releasing means.

When tension is applied to the cable 62, a ring 63 connected to cylinder 57 and held by the latching device 60 is forced from the hooked portion allowing the cylinder 57 to fall in an arc restricted by cables 58. At the point of maximum momentum, at the bottom of the arc the cylinder 57 impinges the target 42 in the manner illustrated in the enlarged Fig. 9. As illustrated, the cylinder 57 is provided with a cushion or sheath 65 made of a resilient material, such as neoprene rubber. The cushion 65 may effectively control the frequency characteristics of the energy imparted at the target 42 and its associated structure.

Target 42 and associated structure including the framework and anchoring pipes illustrated in Fig. 7 and the earth to which they are attached comprise a resiliently supported system having a natural vibration frequency. The structures together with the cushion 65 react with the weight or mass 57 to impart a pulse to the earth whose character may to some degree be controlled by the thickness of the membrane 65 and its resilient properties. In practice the membrane 65 may eliminate transmission of high frequency components to the target 42 thereby to eliminate or minimize as much as possible high frequency noises from the record subsequently to be produced. This may be particularly true when the target is anchored in rigid surface formation. However, in the general case, the dimensions and stiffness of the sheath 65 may be selected to give to the mass 57 a natural frequency in the seismic range. In accordance with well known principles of mechanics the natural frequency of the system of Fig. 9 would be $$fn=\frac{1}{2\pi}\sqrt{\frac{k}{m}}$$

where $k$ is the stiffness of the cushion 65 and $m$ is the mass of cylinder 57. The cushion or sheath 65 may be replaced by a mechanical system or by other materials to give to the energy the desired frequency characteristic.

In the system illustrated in Figs. 4-6 the target is at or adjacent the plane of the earth's surface. In the system illustrated in Fig. 10 a trench 66 is provided with an abrupt vertical face at one end and a target member 67 mounted thereagainst for receiving the cylindrical weight 57 at the lower end of its arcuate traverse. In some areas the trenched arrangement may be preferred to the coupling member of Fig. 7.

While not shown in Figs. 4-10, it will be preferred, as above indicated, to space detector geophones along a line normal to the plane of the trajectory of the moving mass 57 and orient them for detection of the polarized waves.

In Fig. 11 another modification of shear wave generator is illustrated and comprises a cannon 70, which in the form illustrated, is suspended from a suitable support by a pair of springs 71 and 72 with its muzzle adjacent a target 73. The target is anchored to the earth as by pipes 74 and 75. A piston or cylindrical weight 76 is fitted in the bore of the cannon for impact on target 73 when suitably propelled through the cannon. Energy is imparted to the weight 76 by means of compressed air from a tank, such as tank 77, connected by way of a valve 78 and a hose 79 to the chamber of the cannon 70. A suitable latching and triggering mechanism (not shown) may be provided for restraining the weight 76 at or near the breach end of the cannon 70 with air pressure from the tank 70 applied to the cannon. Such latching mechanism may then be actuated to release the weight at a desired instant.

In this modification the cannon muzzle will preferably have a mass large compared to that of the weight 76 so that the displacement of the barrel, when air pressure is applied to the chamber, will be small compared to the displacement of the weight. It will be apparent that it would be entirely satisfactory to mount the cannon on the target structure for the acceleration of the entire structure upon application of air pressure to the cannon would be small compared with the acceleration upon impact of the weight upon a suitable target. Other modifications, of course, may be made to provide a suitable propelling and target system.

The devices above described may be found satisfactory for generation of shear waves for seismic exploration. In wave generation of this type the problem is principally one of imparting sufficient energy to the earth to penetrate depths of interest for the production of reflections of sufficient amplitude to be above the natural seismic unrest. In accordance with one embodiment of the invention, of the form illustrated in Fig. 4, the cylinder had a weight of 400 pounds. The cylinder was suspended on cables at a height of approximately 6 feet. The target was anchored in a clay surface formation by 25 pipes 4 inches in diameter extending into the earth approximately 2½ feet each. The anchor device of Fig. 7 encompassed an area approximately 8 feet by 16 feet. The cushion 65 was a neoprene rubber disc ⅜ inch thick, and the face of the cylinder was approximately 5 inches in diameter. Predominant energy was in the 20 to 40 cycle per second range. It will be appreciated that the use of higher impact forces on a more rigid coupling in general raises the frequency of energy imparted to the earth in its shear waves.

In connection with the use of the present invention, there will be provided suitable means for generating an electrical signal coincident with or indicative of the instant the shear wave is imparted to the earth formations. As in Fig. 1, a geophone buried in the earth's surface at the sending location may be utilized. A strain gauge operable on impact of the weight is suitable.

A detector suitable for horizontally polarized shear waves is illustrated in the patent to Loper et al. No. 2,587,346. Alternatively, there is available on the market a geophone, type EVS–H, manufactured and sold by Electro-Technical Labs, Inc., 504 Waugh Drive, Houston, Texas, that has been found to be satisfactory.

The system generically illustrated in Figs. 1–3 is described and claimed in the co-pending application of James E. White and Stanley N. Heaps for Shear Wave Seismic Exploration, S. N. 286,760, filed May 8, 1952.

While the invention has been illustrated and described by certain modifications thereof, it will be apparent that other modifications may now suggest themselves to those skilled in the art, and it is intended to cover such modifications as fall within the scope of the appended claims.

What is claimed is:

1. A system for generating horizontally polarized shear waves for seismically exploring earth formations which comprises a target, a plurality of arms rigidly attached to said target and extending along horizontal lines which pass through the center of said target, earth anchoring means rigidly connected to each of said arms for coupling said target to the surface of the earth, said earth anchoring means being disposed at spaced points throughout the area encompassed by said arms, a heavy mass, and means for directing said mass at said target along a horizontal path for imparting to the earth the kinetic energy of said mass.

2. A generator for producing horizontally polarized shear waves for seismically exploring earth formations which comprises an earth anchor which includes a rigid framework encompassing a substantial surface area, a plurality of legs coupled to said framework and embedded in the earth at points throughout said area, a target mounted on said anchor substantially symmetrical with respect to a horizontal line passing through the center of gravity of said anchor, a heavy mass having a contacting portion for impinging the face of said target, and means for directing said heavy mass along a path at least in part horizontal intersecting said target at said horizontal line.

3. A system for generating horizontally polarized shear waves for seismically exploring earth formations which comprises a target, a plurality of arms rigidly attached to said target and extending along horizontal lines which pass through the center of said target, earth anchoring means connected to each of said arms for coupling said target to the surface of the earth, said earth anchoring means being disposed at spaced points throughout the area encompassed by said arms, a heavy mass, means above said target for supporting said mass as a pendulum in contact with said target at its rest or equilibrium position, and means for releasing said mass from a point in a pendulous path substantially horizontal from the supporting point for impinging said target to impart to the earth the kinetic energy thereof as a horizontally polarized shear wave.

4. A generator for producing horizontally polarized shear waves of preselected frequency content which comprises an earth anchor which includes a rigid framework encompassing a substantial surface area, a plurality of legs coupled to said framework and embedded in the earth at points throughout said area, a target mounted on said framework substantially symmetrical to a horizontal line passing through the center of gravity of said anchor, a heavy mass, means for directing said heavy mass along a path at least in part horizontal and intersecting said target at the horizontal portion of said path, and means in said path between said mass and said target having a stiffness which brings said mass to a stop in one quarter of the period of said predetermined frequency for transmitting the energy of said mass through said anchor to the earth at said frequency.

5. A generator for producing horizontally polarized shear waves of preselected frequency content which comprises an earth anchor which includes a rigid framework encompassing a substantial surface area, a plurality of legs coupled to said framework and embedded in the earth at points throughout said area, a target mounted on said framework substantially symmetrical to a horizontal line passing through the center of gravity of said anchor, a heavy mass, means for directing said heavy mass along a path at least in part horizontal and intersecting said target at the horizontal portion of said path, a resilient disk in said path between said mass and said target of stiffness to bring said mass to a stop in an interval equal to one-quarter of the period of said predetermined frequency for transmitting the energy of said mass through said anchor to the earth as a horizontally polarized shear wave predominantly at said frequency.

References Cited in the file of this patent

UNITED STATES PATENTS

| | | |
|---|---|---|
| 974,450 | Tully | Nov. 1, 1910 |
| 2,275,735 | Cloud | Mar. 10, 1942 |
| 2,362,589 | Simmons, Jr. | Nov. 14, 1944 |
| 2,388,246 | Berger | Nov. 6, 1945 |
| 2,498,844 | Sears et al. | Feb. 28, 1950 |
| 2,499,605 | Nicolson | Mar. 7, 1950 |
| 2,602,327 | Bond | July 8, 1952 |